United States Patent [19]
Vitalis

[11] 3,966,242
[45] June 29, 1976

[54] LOCKING MECHANISM IN PARTICULAR FOR A VEHICLE BONNET

[75] Inventor: Raymond Vitalis, Montbeliard, France

[73] Assignees: Automobiles Peugeot, Paris; Regie Nationale des Usines Renault, Boulogne-Billancourt, both of France

[22] Filed: Feb. 3, 1975

[21] Appl. No.: 546,776

[30] Foreign Application Priority Data
Feb. 20, 1974 France .............................. 74.05759

[52] U.S. Cl. ................................ 292/19; 292/50; 292/84; 292/341.17; 292/DIG. 14
[51] Int. Cl.² .......................................... E05C 19/06
[58] Field of Search ............ 292/19, 87, 84, 341.15, 292/341.17, DIG. 14, DIG. 43, 54, 53, 50, 42, 41, 38; 70/240

[56] References Cited
UNITED STATES PATENTS
2,809,064  10/1957  Dlugatch ............................ 292/226

FOREIGN PATENTS OR APPLICATIONS
1,181,268  1/1959  France ................................ 292/87

Primary Examiner—Robert L. Wolfe
Attorney, Agent, or Firm—Burns, Doane, Swecker & Mathis

[57] ABSTRACT

The mechanism comprises two sub-assemblies constituting respectively a keeper and a bolt, one of which sub-assemblies has a mount on which is mounted a spring-biased movable member adapted to cooperate with a part of the other sub-assembly to lock the part when the sub-assemblies are brought together and the movable member is brought to a locking position by a manual control. The mount carries a fixed member having an end portion extending out of the mount and the movable member has an end portion also extending out of the mount. The two end portions define aligned eyes for the manual control.

9 Claims, 7 Drawing Figures

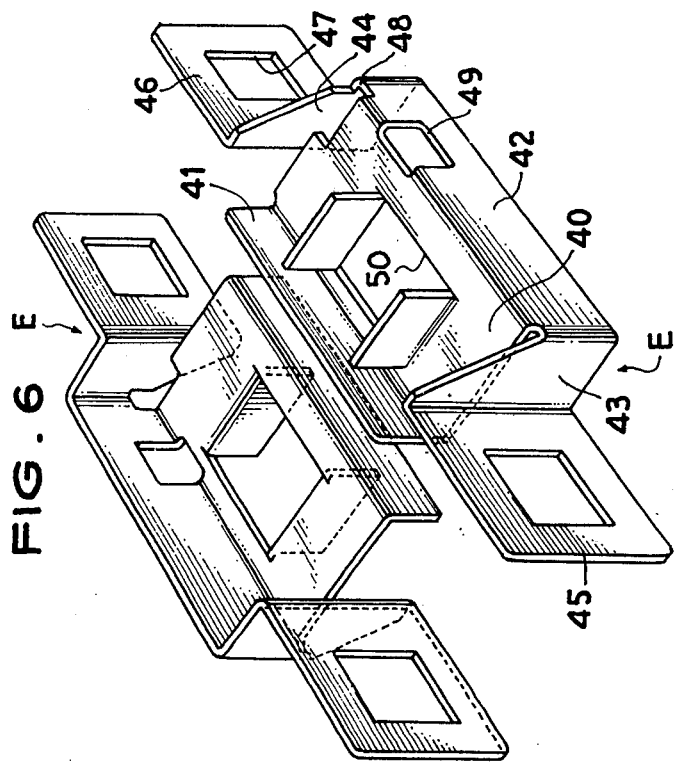
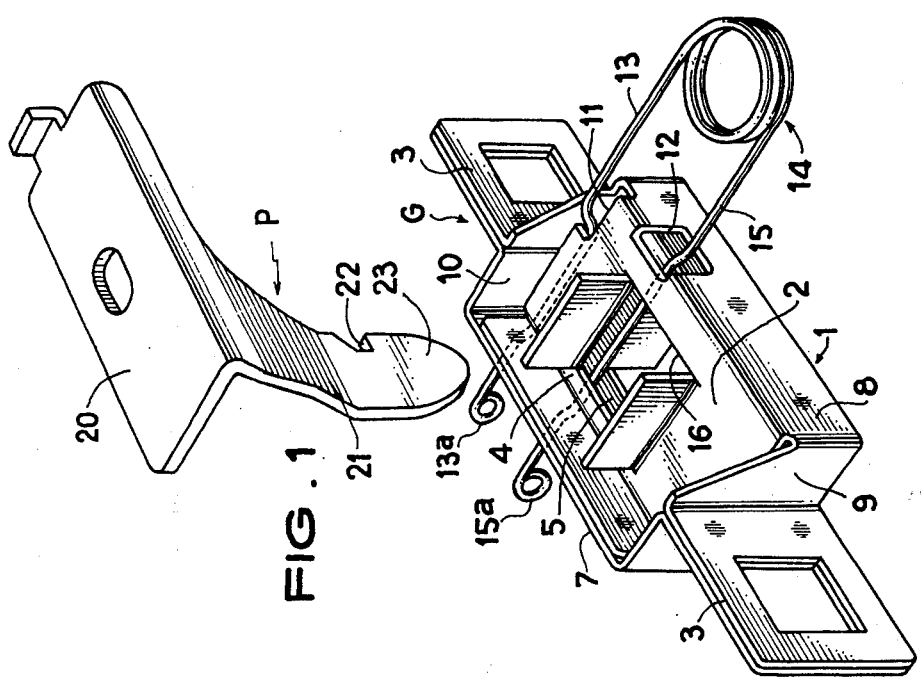

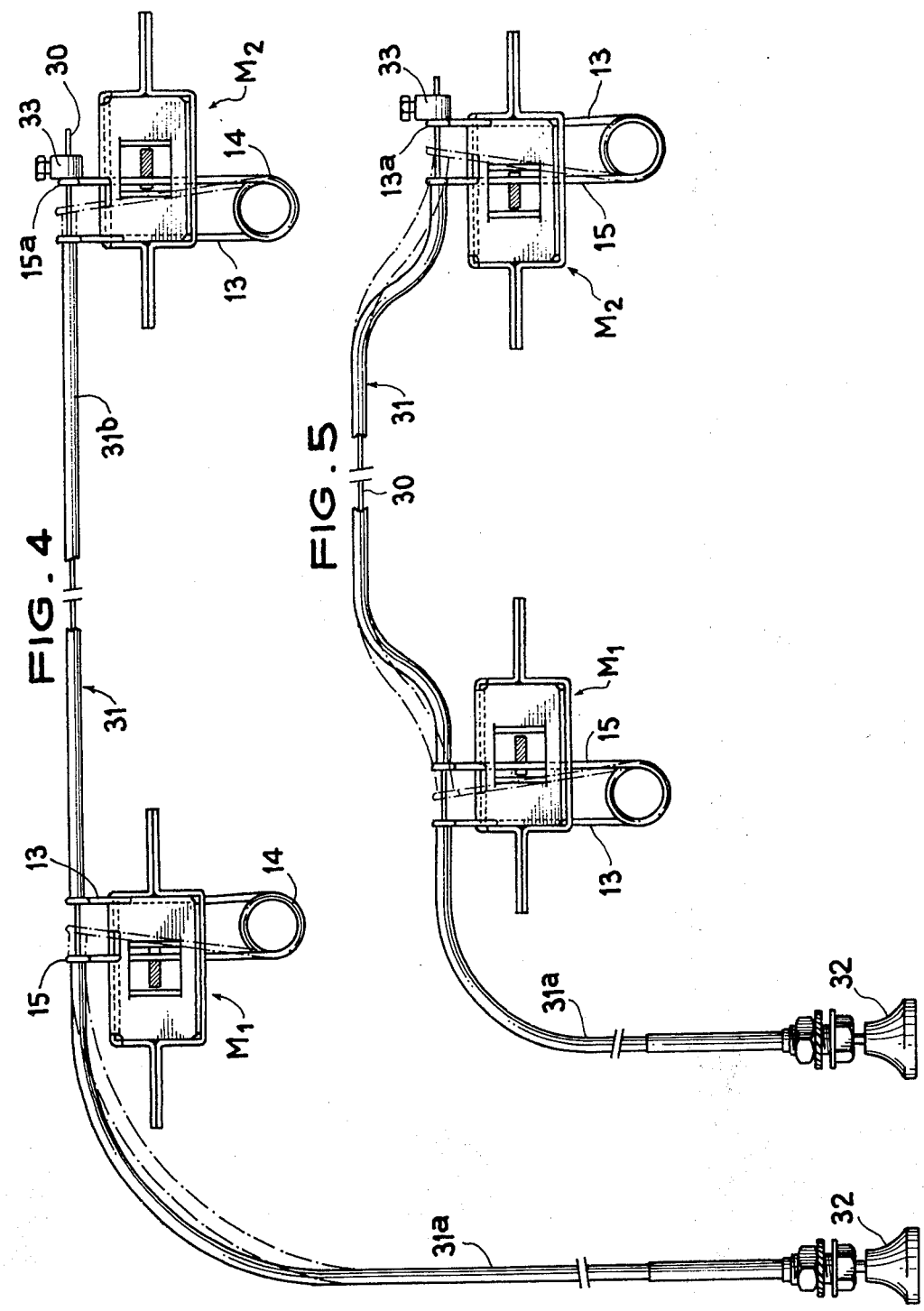

LOCKING MECHANISM IN PARTICULAR FOR A VEHICLE BONNET

The present invention relates to locking mechanisms for locking a movable member with respect to a fixed frame in its closing position. By way of example, such a mechanism may be employed for closing the bonnet of an automobile vehicle.

These mechanisms are of the type comprising two complementary sub-assemblies which are respectively secured to the fixed frame and to the movable element. The fixed sub-assembly is usually constituted by a mount fixed to the frame and carrying a movable member which is resiliently biased to a locking position and can be brought to the unlocking position by suitable actuating means, for example a cable. The sub-assembly connected to the movable element is complementary and can constitute a keeper or a bolt according as the fixed sub-assembly itself performs the other function.

A particular problem arises when arranging such mechanisms on vehicles, due mainly to the position they occupy with respect to the control means, such as a knob for the like, which is usually placed in the passenger compartment. Indeed, according as the control is effected from the right or left side, different mounts of different construction are required and this multiplies the number of parts to be stored, increases the manufacturing cost and complicates the assembly. Moreover, when two mechanisms are employed for closing a given bonnet and must therefore be actuated from a common control means, it is necessary to provide direction-changing means, such as a bell-crank or the like, so as to be in a position to correctly actuate one of the two mechanisms.

An object of the present invention is to provide a locking mechanism which does not have these drawbacks, is simple in construction and can be placed indifferently in various positions with respect to the frame and to the movable element that it is adapted to equip, and which can be actuated by very simple means.

According to the invention, there is provided a locking mechanism comprising two complementary sub-assemblies respectively forming a keeper and a bolt, one of the sub-assemblies comprising a mount on which is disposed a movable member adapted to co-operate with a part of the other sub-assembly, said movable member being elastically biased to its locking position and being movable by manual control means to an unlocking position, wherein the mount carries a substantially fixed member having one end portion which is in projecting relation and has a hooking eye or passage for manual control means, the movable member carried by the mount also comprising a portion which is in projecting relation and provided with an eye which is substantially coaxial with the eye of the fixed member.

Preferably, the fixed member and the movable member are constituted by two branches of a hairpin-shaped spring the mount defines a cavity in which are trapped the fixed and movable members, the movable member extending through an opening formed in the mount and accessible from two opposite sides of the mount.

According to other features, the mount has a certain symmetry so as to be capable of being mounted in various positions on its fixed support. It is preferably constituted by two identical elements assembled by any suitable means, for example spot welding, these two elements being obtained by blanking and folding sheet metal.

The particular shape of these elements and the shape of the blanks from which they are obtained are also part of this invention and will be described in more detail in the ensuing description of one embodiment of the invention with reference to the accompanying drawings, in which:

FIG. 1 is a perspective view of the locking mechanism according to the invention, when the bolt is spaced away from the keeper;

FIGS. 4 and 5 are two diagrams showing a possible utilization of two associated devices according to the invention;

FIG. 6 is a perspective view of two elements which constitute the mount of the mechanism spaced apart from each other.

Figure 3:
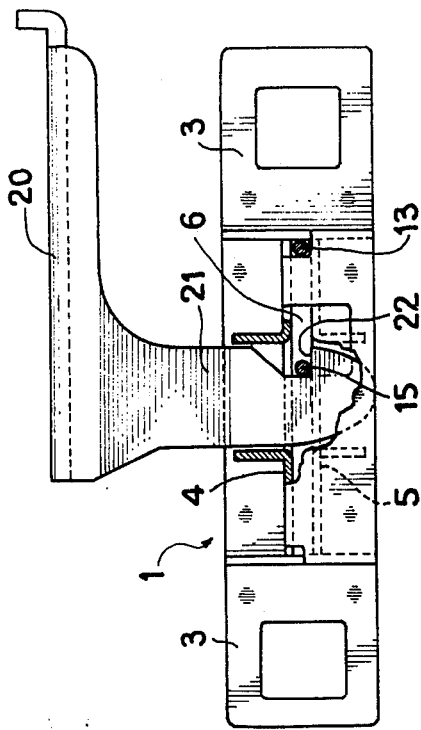
FIG. 3 is a partly elevational and partly sectional view of the mechanism shown in FIG. 2.
Figure 2:
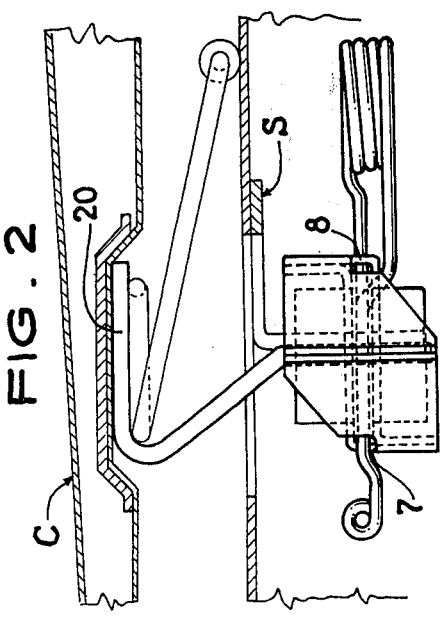
FIG. 2 is an enlarged view of the mounting of a mechanism according to the invention for example for locking a vehicle bonnet.

With reference first to FIGS. 1 to 3, there will be now described a mechanism according to the invention and some of the constituent parts thereof.

The locking mechanism comprises two complementary sub-assemblies forming respectively the keeper and the bolt. The keeper is designated generally by the reference G whereas the bolt is designated generally by the reference P.

The keeper comprises a mount 1 having a centre body 2 from which extend two lateral tabs 3 which are substantially contained in the same plane and adapted to fix the keeper to a support S (FIG. 2). The centre body has two walls 4, 5 which are parallel and perpendicular to the fixing tabs and define a cavity 6 which is substantially closed along its outer edges by flanges 7, 8 which are parallel to the fixing tabs and transverse walls 8, 10, perpendicular to the fixing tabs and to the walls 4, 5 of the body. In the flanges 7, 8 there are formed openings 11, 12, the opening 11 merely permitting the passage of one, 13, of the branches of a hairpin-shaped spring 14 without possibility of lateral movements whereas the other opening 12 has a width substantially greater than that of the other branch, 16, of the spring so as to permit a lateral movement of this branch. On its opposed side, the mount has two identical openings in alignment with the two first mentioned openings.

The parallel walls 4, 5 of the body each comprise an opening 16, the two openings being in alignment and opening consequently onto two sides of the mount. In the illustrated embodiment, these two openings are rectangular and obtained by lancing the two walls 4 and 5.

Trapped in the mount 1 is a hairpin-shaped spring 14 whose two branches 13 and 15 respectively extend through the openings 11, 12, the second branch 15 also extending through the opening 16. These two branches terminate at their free ends in coaxial eyes 13a, 15a. Moreover, they have along their length suitable deformations and are cranked, on one hand, to ensure their maintenance in the mount, and, on the other, so that their two end portions are parallel and the two eyes 13a, 15a are in alignment.

The bolt P is blanked from sheet metal which is sufficiently rigid and has a tab 20 for fixing to the support, such as the bonnet C of a vehicle (FIG. 2), and a portion 21 constituting the bolt proper which is of the catch type 22. The bolt has a fixed end portion 23.

Before describing in detail the construction of the mount and of the possible utilizations of the mechanism, the operation of the latter will be briefly explained. When the bolt is moved toward the mount, its rounded end portion 22 is engaged in the opening 16 and laterally urges back the movable branch of the spring until the movable branch reaches the region of the catch 22, that is to say, elastically urges back and engages behind this catch and thus retains the bolt (FIG. 3). To unlock and disengage the bolt, it is sufficient to act on the free end of the branch 15 of the spring by moving this free end toward the fixed branch 13 until it disengages from the catch 22. It is then sufficient to raise the latter to disengage the bolt.

One example of the application of the locking mechanism just described is shown in FIGS. 4 and 5 which correspond, for example, to a double locking device for a vehicle bonnet controlled by a cable. In the case shown in FIG. 4, there are provided two identical mechanisms M1 and M2 disposed at a certain distance apart in a symmetrical manner with respect to a median plane (not shown). This is manifested by the fact that the two fixed branches 13 of the two springs 14 are disposed in facing relation to each other. The control mechanism comprises a cable 30 disposed in a sheath 31 one end of which is integral with a knob 32 disposed, for example, on the dashboard of the vehicle whereas its other end has a cable grip 33 which abuts against the eyes 15a of the movable branch 15 of the mechanism M2 which is the most remote from the knob 32. The cable extends through the four eyes of the springs 14 and the sheath is divided into two sections, the section 31a extending between the knob 32 and the movable branch 15 of the first mechanism M1 and the other section 31b extending between the two fixed branches 13 of the two mechanisms.

When the user exerts a traction on the knob 32, the portion of the cable between this knob and the first mechanism is rendered taut and assumes the shape shown in dot-dash line in FIG. 4 and this has for consequence to shift the two movable branches 15 of the springs to positions which are also shown in dot-dash line and thus disengages the two bolts.

Note that in this case the sheath portion 31b between the two mechanisms is optional and its absence would in no way modify the operation just described.

In the embodiment shown in FIG. 5, the two mechanisms M1, M2 are mounted in opposite directions with respect to those shown in FIG. 4 so that it is the two movable branches 15 which are facing each other. In this embodiment, it is assumed that, in its part between the two mechanisms, the cable must pass round an obstacle so that it is necessary to provide a sheath in this region. The cable grip 33 is in abutment against the fixed branch 13 of the mechanism M2.

In this arrangement, when the user exerts a traction on the knob 32, the cable 30 is rendered taut and deformed in its part between the two mechanisms and takes up the position shown in dot-dash line which results, due to a series of actions and reactions, in the displacement of the two movable branches 15 which move away from each other and thereby release the two bolts as in the foregoing embodiment.

Note that in all the examples of utilization the force which is exerted on the knob is identical irrespective of the number of mechanisms assembled in series, since these mechanisms are in fact actuated one after the other. On the other hand, it is clear that the travel of the knob is proportional to the number of mechanisms employed.

With reference again to the particular construction of the mount shown in FIGS. 1 and 6, this mount is constituted by two exactly identical elements E which are blanked and folded in such manner as to obtain, after assembly and spot welding, the shape described with reference to FIG. 1. Thus each one of these elements comprises:

a centre portion formed by a median wall 40 and two lateral flanges 41, 42 perpendicular to this wall;

two lateral walls 43, 44 extending the flange 42 but extending in the direction perpendicular to this flange and to the median wall;

two fixing tabs 45, 46 which also extend the two lateral walls 43, 44 but extend at right angles with respect to the latter.

Cut-away portions are provided, constituted by apertures 47 in the fixing tabs, a notch 48 and an opening 49 formed in the vertical flange 42 and an opening 50 obtained by piercing in the median wall 40.

These two elements are thereafter brought together and assembled after the hairpin-shaped spring has been placed in position as shown in FIG. 1.

Figure 7:
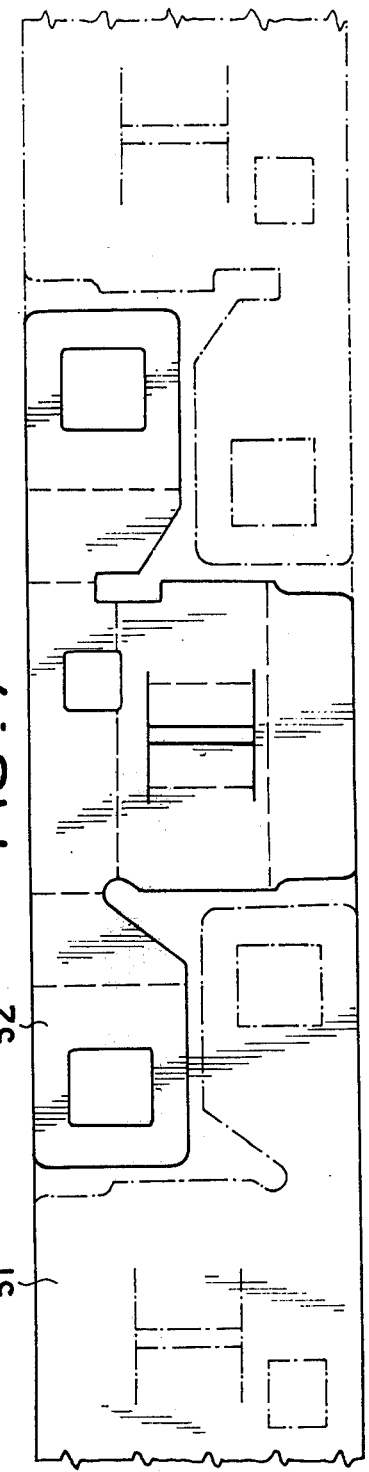
FIG. 7 is a view of a strip of sheet metal in which the blanks are blanked to obtain the elements shown in FIG. 6.

FIG. 7 shows a strip of sheet metal 51 in which are blanked the blanks 52 from which the elements shown in FIG. 6 are obtained. Each one of these blanks has the general shape of a T as can be seen in the drawing and is arranged in such manner as to permit, after folding along the dotted line, obtaining the element shown in FIG. 6. It is unnecessary to describe in detail the shape of this blank but it can be observed that it is such that the loss of material is very small so that the mount, and consequently the whole of the mechanisms, can be produced at low cost for the mounts and consequently for the whole mechanism. In particular, the T shape of this blank permits interengaging adjacent blanks which results in a very low percentage of scrap.

Briefly, the device just described permits, by the design and shape of the mount employed, very numerous adaptations and assemblies in very varied positions, this possibility being in particular due to a certain symmetry in the shape of the mount and in the particular shape of the locking element which cooperates with the bolt and is constituted by a hairpin-shaped spring whose branches are substantially parallel to each other and have end portions which constitute aligned fixing eyes.

Moreover, the fact that the mount is constructed from two identical elements manufactured from blanked and folded sheet metal results in particularly low cost.

As concerns the utilization, the advantages obtained are in particular due to the fact that the mechanism can be controlled both from one side and the other and that in an assembly comprising two mechanisms, the locking control is by means of a single cable without increase in the pulling force to be exerted and with no necessity to employ direction-changing mechanisms employing a bell-crank or the like which complicate the devices and increase their cost.

Having now described my invention what I claim as new and desire to secure by Letters Patent is:

1. A locking device for relatively movable first and second parts, comprising a locking mechanism comprising two complementary sub-assemblies respectively forming a keeper and a bolt, a first of the sub-assemblies comprising a mount, a hair-pin shaped spring having a first branch and a second branch which branches have end portions which define eyes adjacent free ends of the branches, said end portions extending out of the mount, the first sub-assembly having means for holding a portion of the first branch adjacent said end portion stationary with respect to the mount transversely of the first branch while leaving the remainder of the spring free to be elastically deformed in a given plane so that the second branch is free to move elastically with respect to the mount transversely of the second branch in said plane between a locking position and an unlocking position, the first sub-assembly having means for precluding movement of the second branch in directions other than in said plane, a second of the sub-assemblies having a part engageable by the second branch in said locking position of the second branch so as to be locked by the second branch when the two assemblies are brought together, the second sub-assembly being for mounting on the first part and the second sub-assembly being for mounting on the second part, and cable control means for shifting the second branch to said unlocking position in opposition to the elastically yieldable resistance of the spring, the control means comprising a cable and a sheath and the sheath being in abutting relation to the eye of one of the branches and stop means combined with the cable putting the cable in abutting relation to the other of said eyes.

2. A locking device for relatively movable first and second parts, comprising cable control means and a plurality of locking mechanisms, each locking mechanism comprising two complementary sub-assemblies respectively forming a keeper and a bolt, a first of the sub-assemblies comprising a mount, a movable member disposed on the mount and means for elastically biasing the movable member to a locking position, the movable member being movable to an unlocking position, a second of said sub-assemblies having a part engageable by the movable member in said locking position of the movable member so as to be locked by the movable member when the two sub-assemblies are brought together, a substantially fixed member also carried by the mount and having an end portion which is in projecting relation to the mount and defines a first passage for manual control means for moving the movable member, the movable member also having a portion which is in projecting relation to the mount and defines a second passage which is substantially coaxial with the first passage of the fixed member, the second sub-assembly being for mounting on the first part and the first sub-assembly being for mounting on the second part, the cable control means comprising a cable having an end which is in abutment against one of the fixed and movable members of the adjacent locking mechanism and another end connected to cable shifting means, the cable extending through said passage of the other of said fixed and movable members of said adjacent locking mechanism and a sheath provided between the shifting means and one of the fixed and movable members of the locking mechanism adjacent the shifting means, said sheath being in abutment against the last-mentioned one of the fixed and movable members.

3. A device as claimed in claim 2, comprising a second sheath portion for the cable interposed between the adjacent ones of the fixed and movable members of two adjacent locking mechanisms.

4. A device as claimed in claim 1, comprising a cavity defined by the mount, means for trapping the first branch and second branch in the cavity, an opening defined by the mount giving access to the cavity, the second branch extending through the opening and being accessible from two opposite sides of the mount.

5. A device as claimed in claim 1, wherein the mount comprises two inner walls defining therebetween a cavity which is substantially central in the mount and in which cavity the first branch and second branch extend, two parallel lateral flanges and two transverse walls closing the cavity, fixing tabs extending from the transverse walls, the lateral flanges defining two aligned first openings and two aligned second openings, the first openings being traversed by the first branch and being narrow for laterally blocking the first branch and the second openings being traversed by the second branch and being wider than the first openings to permit a lateral movement of the second branch in said plane.

6. A device as claimed in claim 2, wherein in each mechanism the fixed member and the movable member are constituted by two branches of a hair-pin shaped spring, which spring embodies said means for elastically biasing the movable member.

7. A device as claimed in claim 6, wherein the two branches of the spring are shaped to engage the mount in such manner as to be blocked longitudinally with respect to the mount.

8. A device as claimed in claim 2, wherein in each mechanism the mount is constituted by two identical blanked pierced and folded sheet metal elements assembled by any suitable means.

9. A device as claimed in claim 8, wherein each one of the identical elements of the mount are constructed from a blank of sheet metal having the general shape of a T.

* * * * *